United States Patent
Neumann et al.

(10) Patent No.: US 9,732,199 B2
(45) Date of Patent: Aug. 15, 2017

(54) METHOD FOR PRODUCING A BREATHABLE FILM

(71) Applicants: Thorsten Neumann, Kupferzell (DE); Birgit Kammerer, Kupferzell (DE)

(72) Inventors: Thorsten Neumann, Kupferzell (DE); Birgit Kammerer, Kupferzell (DE)

(73) Assignee: Konrad Hornschuch AG, Weissbach (DE)

( * ) Notice: Subject to any disclaimer, the term of this patent is extended or adjusted under 35 U.S.C. 154(b) by 0 days.

(21) Appl. No.: 14/643,540

(22) Filed: Mar. 10, 2015

(65) Prior Publication Data
US 2015/0259498 A1    Sep. 17, 2015

(30) Foreign Application Priority Data

Mar. 11, 2014   (DE) .................. 10 2014 103 201
Jul. 30, 2014   (DE) .................. 10 2014 110 813

(51) Int. Cl.
*C08J 9/28* (2006.01)
*D06N 3/06* (2006.01)
(Continued)

(52) U.S. Cl.
CPC ............. *C08J 9/28* (2013.01); *C08J 9/0061* (2013.01); *C08L 27/06* (2013.01); *D06N 3/0043* (2013.01);
(Continued)

(58) Field of Classification Search
CPC ............ C08J 9/28; C08J 2327/06; B29D 7/01
See application file for complete search history.

(56) References Cited

U.S. PATENT DOCUMENTS 3,440,185 A * 4/1969 Hanley .................. C08J 9/28
                                                    264/126
3,627,717 A * 12/1971 Kuhnen .................. C08F 2/10
                                                    524/395
(Continued)

FOREIGN PATENT DOCUMENTS

DE        1960992        6/1970
DE        1 944 310      3/1971
(Continued)

OTHER PUBLICATIONS

"PolyOne Geon 120 Series 120×400 Polyvinyl Chloride Homopolymer (PVC Homopolymer)" by Matweb. Accessed May 27, 2016 at http://www.matweb.com/search/datasheet.aspx?matguid=865acb4be0a141a3bf0ed61d4f8la1f9&ckck=1.*
(Continued)

*Primary Examiner* — Mike M Dollinger
*Assistant Examiner* — Christina Wales
(74) *Attorney, Agent, or Firm* — Pauley Erickson & Kottis

(57) ABSTRACT

A method for producing a breathable film based on polyvinyl chloride (PVC), including the following steps. Preparing a paste-like compound including a first fraction composed of PVC, a second fraction composed of a foreign material, and a third fraction composed of adjuvants and/or additives that that are mixed together to form the paste-like compound, applying the paste-like compound to a base, and drying and gelling the paste-like compound, which has been applied to the base, through the addition of heat, thus forming the film in which pores extending from the one surface of the film to the other are formed, which give the film breathability.

19 Claims, 1 Drawing Sheet

(51) Int. Cl.
*D06N 3/14* (2006.01)
*C08J 9/00* (2006.01)
*D06N 3/00* (2006.01)
*D06N 3/08* (2006.01)
*C08L 27/06* (2006.01)

(52) U.S. Cl.
CPC ............... *D06N 3/06* (2013.01); *D06N 3/08* (2013.01); *D06N 3/144* (2013.01); *C08J 2201/05* (2013.01); *C08J 2327/06* (2013.01)

(56) References Cited

U.S. PATENT DOCUMENTS

| | | | | |
|---|---|---|---|---|
| 3,765,925 | A | * | 10/1973 | Murphy ............... C08J 9/28 427/341 |
| 3,770,665 | A | * | 11/1973 | Jurgeleit ............... C08J 9/30 521/145 |
| 3,778,332 | A | | 12/1973 | Butler et al. |
| 4,006,052 | A | | 2/1977 | Wang |
| 4,496,624 | A | | 1/1985 | McCartney |
| 2010/0267299 | A1 | | 10/2010 | Anderle et al. |

FOREIGN PATENT DOCUMENTS

| | | |
|---|---|---|
| DE | 2 127 132 A1 | 12/1971 |
| DE | 2 143 749 A1 | 3/1972 |
| DE | 10 2014 103 201.2 | 3/2014 |
| DE | 10 2014 110 813.2 | 7/2014 |
| EP | 0 400 420 | 12/1990 |
| EP | 2 653 607 A1 | 10/2013 |
| WO | WO 2009/067384 A1 | 5/2009 |

OTHER PUBLICATIONS

Kalfoglou, N. K. "Property-Composition Dependence of Polyurethane-Poly(vinyl Chloride) Polyblends" J. Ap. Poly. Sci., 26, 823-831. 1981.*

* cited by examiner

METHOD FOR PRODUCING A BREATHABLE FILM

BACKGROUND OF THE INVENTION

Field of the Invention

This invention relates to a method for producing a breathable film based on polyvinyl chloride (PVC).

Discussion of Related Art

PVC-based films are used, for example, in the production of imitation leathers, in which as a rule, a composite of textile and glass or carbon fiber weaves, knits, polymer foams or nonwovens is provided with a coating of a PVC film of this kind. Depending on the application, these coatings can be embodied as compact or foamed and can have a grained surface provided, for example, by stamping so that they correspond to a leather structure.

If the PVC-based film is to have breathable properties, which is advantageous, for example, in a seat cover or in shoe uppers as well as in wall and ceiling coverings in order to permit water vapor to pass through, then the film must have a sufficient number of pores through which the water vapor can pass.

In the prior art, it is known to take inherently non-breathable PVC-based films and make them breathable, for example by needling, such as the pores are mechanically produced.

German Patent Reference DE 1 960 992 A1 discloses producing a breathable, microporous film material made of a polymer mixture including polyurethane elastomers and polyvinyl chloride, and the polymer is dissolved in an organic solvent, applied in a thin layer to a substrate whose substrate surface is wetted with a precipitating agent and the underside of the thus coated substrate is brought into contact with a porous support, which is for its part also wetted with a precipitating agent, until the polymer has precipitated on the surface of the substrate in the form of a microporous layer that is essentially free of macro-cavities. The known method is therefore not only extremely complex in terms of equipment and not very efficient, but also appears to be in need of improvement from the standpoint of health and environmental protection due to its preferred use of the solvent dimethylformamide.

SUMMARY OF THE INVENTION

One object of this invention is to provide a method for producing a breathable PVC-based film, which is distinguished by a simple method procedure in particular based on already existing equipment and which functions without solvents that are hazardous to health or the environment.

In order to attain the stated object and others, this invention proposes a method according to the features described in this specification and in the claims.

The method proposed according to some embodiments of this invention is based on the sequence of the following steps.

1. Preparing a paste-like compound including a first fraction composed of or including PVC, a second fraction composed of or including a foreign material, and a third fraction composed of or including adjuvants and additives that that are blended, dispersed, and/or mixed together to form the paste-like compound.

2. Applying the paste-like compound composed of or including the first through third fractions to a suitable base.

3. Drying and gelling of the paste-like compound, which has been applied to the base, through the addition of heat, thus forming the desired film within which pores extending from the one surface of the film to the other are automatically formed, which give the film the desired breathability.

One essential feature of the method according to this invention thus is that all of the source materials required for producing the film are first mixed, for example stirred, into a paste-like compound, for example, in a shared container, the paste-like compound is then applied in a suitable fashion to be explained in greater detail below to a suitable base that is likewise to be explained in greater detail below, and then the paste-like compound is dried on the base merely through the addition of heat, possibly reacted, and gelled, in the course of or during which the film forms and during the formation of the film, the desired pores are also formed in situ in order to produce the breathable property of the film.

For the above-described automatic pore formation during the drying and gelling of the paste-like compound with the addition of heat, this invention uses the effect that the paste-like compound is composed of or includes chemically incompatible fractions, namely PC and foreign material. In addition, the foreign material in the paste-like compound has a wettability that is only slight and close to zero. During the drying and gelling of the paste-like compound, cracks and/or cavities form at the respective phase or grain boundaries of these incompatible fractions, extending all the way through from the one surface of the film to the other, thus forming pores in the film, and furthermore, the size of the pores can be influenced and adjusted through corresponding adjustments to the method components and method procedure, as explained in greater detail below.

The method according to some embodiments of this invention makes it possible to produce a breathable PVC-based film that is produced without solvents because according to this invention, the paste-like compound is produced from the fractions without the addition of an organic solvent that is harmful to health or the environment, such as other than water.

In order to produce the paste-like compound, only a certain percentage of water can be added to the fractions in order to adjust the viscosity of the paste-like compound. This aqueous percentage, for example, in the second fraction also positively influences the pore formation that this invention takes advantage of and that occurs during the drying of the paste-like compound in order to produce the breathable film.

According to some embodiments of this invention, the first fraction can include emulsion PVC with a K value of 65 to 80, preferably 70-76 and suspension PVCs that can be made into pastes, including commercially available micro-suspension PVCs. It is also possible to use mixtures of the above-mentioned PVC types in the method according to this invention.

According to another proposal of this invention, the second fraction includes a dispersion based on polyurethane, in particular polyether-, polyester-, or polycarbonate polyurethane or mixtures thereof.

Alternative to this, the second fraction can also include a mixture of water and an emulsifier. Suitable emulsifiers in the context of this invention include, for example, soaps based on polyethylene, sulfate, phosphate, or amine. This invention also proposes relative to 100 wt. % of the first fraction using these soaps in a quantity of 0.2 to 10 wt. % with 2 to 50 wt. % water as a second fraction.

According to other embodiments of this invention, the percentages of the first and second fractions in the paste-like compound are chosen so that assuming that the sum of the two fractions makes up 100 wt. %, the second fraction comprises 2 to 60 wt. % of the paste-like compound and correspondingly, the first fraction comprises 98 to 40 wt. % thereof. The third fraction of adjuvants and additives also added to the paste-like compound is left out of consideration in this distribution of weight percentages, such as it is added in addition to the 100 wt. % composed of or including the first and second fractions of the paste-like compound. The added quantities of the adjuvants and additives used in the third fraction can vary within the quantity ranges specified by the respective manufacturers and in this regard, are not subject to any general restrictions.

The adjuvants and additives of the third fraction can, for example, be fillers, softeners, cross-linking agents, stabilizers, kickers, silicones, flame retardants, additives, and/or pigments.

According to some embodiments of this invention, possible fillers include calcium carbonate, cellulose, in particular Arbocel types, calcium sulfate, barium sulfate, silicon dioxide such as TS 100, aluminum hydroxide, aluminum oxide, zinc oxide, and zinc bromide.

Like the fillers, the selection of the softeners used for the application in the method according to this invention is not subject to any general restriction. For example, the softeners used can include phtalates, adipates, sebacates, citrates, 1,2-cyclohexane dicarboxylic acid diisononyl ester, nonaromatic cyclic ester compounds such as DINCH, dioctyl terephthalate (DOTP), epoxy softeners, oligoglycol- or polyethylene glycol-based softeners, castor oil-based softeners, polymer softeners, phosphate softeners, chlorinated and brominated softeners, sulfate softeners, and ionic liquids.

In the third fraction provided according to this invention, possible cross-linking agents include, for example, isocyanates, acridines, carbodiimides, melamines, and peroxides.

In the method according to this invention, possible stabilizers/kickers in the third fraction include those that are based on barium, calcium, cadmium, tin, lead, mercury, antimony, arsenic, thiols or mercaptans, phosphites or phosphates, OBS, zinc, magnesium and/or aluminum, in addition to sterically hindered and unhindered phenols (such as Irganox types), UV stabilizers, in particular HALS, nano-titanium oxides, β-diketones, epoxy-based stabilizers, perchlorate-based stabilizers, and/or amine-based stabilizers.

Furthermore, the third fraction can include flame retardants, the cited examples being antimony oxide, aluminum oxide, hydrotalcite, magnesium hydroxide, magnesium carbonate, calcium carbonate, zinc borate, various phosphates such as ammonium phosphate, expanded graphites, as well as brominated and chlorinated softeners.

Depending on the application, it is also possible for cross-linked, cross-linking, and/or non-cross-linked silicones such as platinum-catalyzed, cross-linked silicones or condensation reaction-based cross-linked silicones to be added in the third fraction of the paste-like compound.

In the third fraction provided according to this invention, possible additives can also include emulsifiers and soaps, antifoaming agents, rheological additives such as thickeners and viscosity reducers, nanotubes, quantum dots, and so forth.

With the method according to this invention, it is possible to produce a breathable film with a compact, such as unfoamed, structure and it is also possible to produce such a breathable film with a foam structure. On the one hand, the foam structure can be formed by producing a foam composed of or including the paste-like compound before it is applied to the base or the third fraction of the paste-like compound can also have blowing agents added to it such as azodicarbonamide, microspheres, silica gel, sodium carbonate, disodium carbonate, OBSH, zeolites, and so forth, which form the cellular structure of the foam during the drying and gelling.

In addition, the third fraction can also contain pigments such as organic or inorganic pigments, metallic pigments, Iriodins, and so forth.

According to another proposal of this invention, the drying and gelling of the paste-like compound for producing the porous film in the method according to this invention take place with an addition of heat at temperatures of between 100° C. and 220° C.

In this connection, according to a continuous production that is particularly preferable with regard to production efficiency, after being applied to the base, for example by a reverse coater or roll coater, by doctor blades, spraying, or printing, the paste-like compound is conveyed together with the base through a drying oven, which, in order to ensure a sufficient drying duration, should have a length of 1 to 80 m and a speed of 2 to 80 m/min.

With the method according to this invention, breathable PVC-based films can be produced that have pores in the film with an average pore diameter in the nanometer to millimeter range, for example, from 1 µm to 1 mm.

Breathable films produced in this way then have a gas permeability in the range from 0.1 to 200 $l\ dm^{-2}\ min^{-1}$, water vapor permeabilities in the range from 0.1 to 200 mg $cm^{-2}\ h^{-1}$, and water impermeabilities in the range from 0.1 to 60 $m^2\ pa^{-1}\ w^{-1}$.

With the method according to this invention, it is possible to produce breathable films with masses per unit area in the range from 50 to 1000 g/m in a simple way.

The pore size and the resulting breathability can be adjusted within a broad range by influencing formulation parameters of the paste-like compound such as iscosity, filler type and filler content, PVC type used in the first fraction, softener type and softener content, polyurethane type used, and the percentage of the second fraction.

The method according to this invention is also particularly suitable for producing imitation leathers that have at least one layer composed of or including a breathable film produced in such a way, for example, a cover layer that is applied to a textile support and is composed of or includes a breathable film produced in such a way.

But as is explained in greater detail below, it is also possible to produce a plurality of additional layers of such an imitation leather using the method according to this invention.

The production of imitation leathers in this case can be carried out in accordance with proven methods. For example, this can include applying the paste-like compound to a base, which is removed from the film after the latter forms, the base being embodied, for example, in the form of an embossed or non-embossed paper, a shape-giving polymer-/plastic mold, a corresponding belt, or steel stamping molds, or the base is composed of or includes a substrate, which remains attached to the film after the latter forms. Examples for such substrates include, for example, textile supports that are part of a composite for producing an imitation leather, such as the paste-like compound applied in the method according to this invention can, for example, by direct coating, be applied directly to the textile support and together with the latter, subjected to the addition of heat, whereupon the paste-like compound on the textile support or another suitable substrate dries and gels, forms the layer of the breathable film, and remains together with the base in the form of the substrate, constituting or forming a multi-layer composite.

It is clear that the method according to this invention enables a particularly efficient manufacturing process.

BRIEF DESCRIPTION OF THE DRAWINGS

This invention is explained in greater detail in view of exemplary embodiments shown in the drawings, wherein.

DETAILED DESCRIPTION OF THE INVENTION

Figure 1:
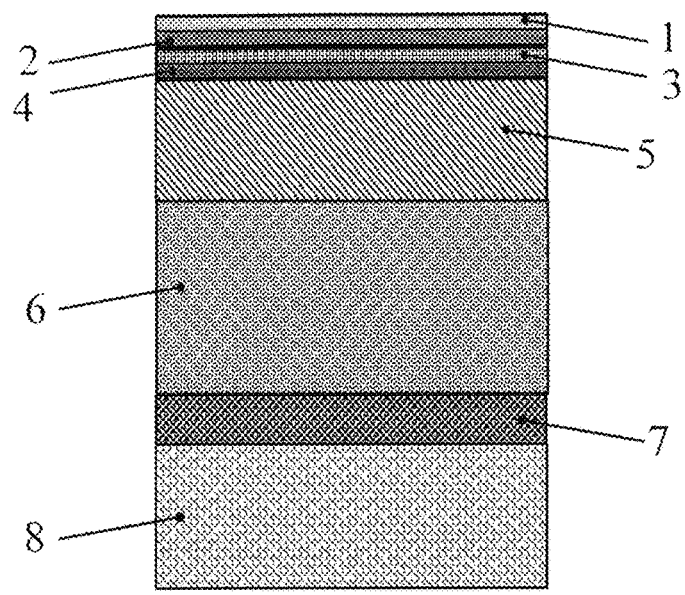
FIG. 1 shows an enlarged section taken through an imitation leather that has been produced using the method according to this invention.

FIG. 1 shows a structure of a multi-layered composite serving as an imitation leather, for example of the kind that can be used as a covering material for seats, such as in automotive interiors.

Starting from a top surface that constitutes or forms the visible side, the individual layers are successively labeled with the reference numerals 1 through 8.

The top layer 1 is composed of, includes or comprises a lacquer layer that determines the feel and sheen and is, for example, based on polyurethane or acrylate, based on PVC or PVDF, or based on aniline-, epoxy- or polyamide polyester, while the layer 2 under this is likewise composed of, includes or comprises a lacquer layer that is, for example, based on acrylate or one of the above-mentioned alternatives and which gives the composite wear resistance.

The layer 3 under this once again a lacquer layer that gives the composite the desired coloring and is therefore usually embodied in the form of a printed layer through the use of suitable pigments.

The next layer 4 is an adhesive layer that can be constructed, for example, on the basis of a lacquer layer containing polyurethane or acrylate. This produces the adhesion of the overlying layers 1 through 3 to the underlying layer 5.

The layer 5 is composed of, includes or comprises a breathable PVC-based film and a foreign material, for example, a foreign polymer based on a polyurethane produced according to the above-explained method and can, for example, have a mass per unit area of 10 to 1000 g/m$^2$, preferably 120 to 500 g/m$^2$.

Underneath this is an intermediate layer 6 likewise based on a breathable film that has been produced using the method according to this invention. This intermediate layer can be embodied in the form of a foam, expanding polymer spheres such as Expancell, or can be foamed through the addition of blowing agents, while the layer 5 on top of it and also the adhesive layer 7 underneath it, which will be explained in greater detail below, are embodied in a compact form. The mass per unit area of the foamed intermediate layer 6 lies in a range of approximately 10 to 1000 g/m$^2$.

Beneath the foamed intermediate layer 6, there is an adhesive layer 7 with a mass per unit area of 50 to 250 g/m$^2$ that can likewise be composed of, include or comprise a breathable film, produced using the method according to this invention. This layer 7 produces the adhesion to the bottom support layer that is labeled with the reference numeral 8, which can in a known fashion be composed of, include or comprise a textile, a polymer, or a foamed support material. This can be a woven support material, a nonwoven, a screen based on organic or inorganic materials such as mineral wool, glass and carbon fibers, and so forth, possibly also with the addition of electrically conductive fibers in order to counteract an electrostatic charging.

The imitation leather according to FIG. 1 is produced, for example, using the so-called reversal process in which first, the intermediate layer 5 is cured on a substrate, such as an embossed or non-embossed paper web, plastic web, or metal web, heated, and coated with a sequence of an intermediate layer 6, and 7, and the support material 8 and heated, then removed from the substrate, and subsequently coated with the layers 1-4, for example, by rasterizing, doctoring, or spraying.

Through the use of suitable methods such as steel embossing, vacuum embossing, silicone sheet roller embossing, and the like, the imitation leather can also have an applied surface embossing in the form of a leather grain structure in the region of or near its visible side, for example in the region of or near the upper breathable layer 5 and the lacquer layers 1 through 4 on top of it.

Figure 2:
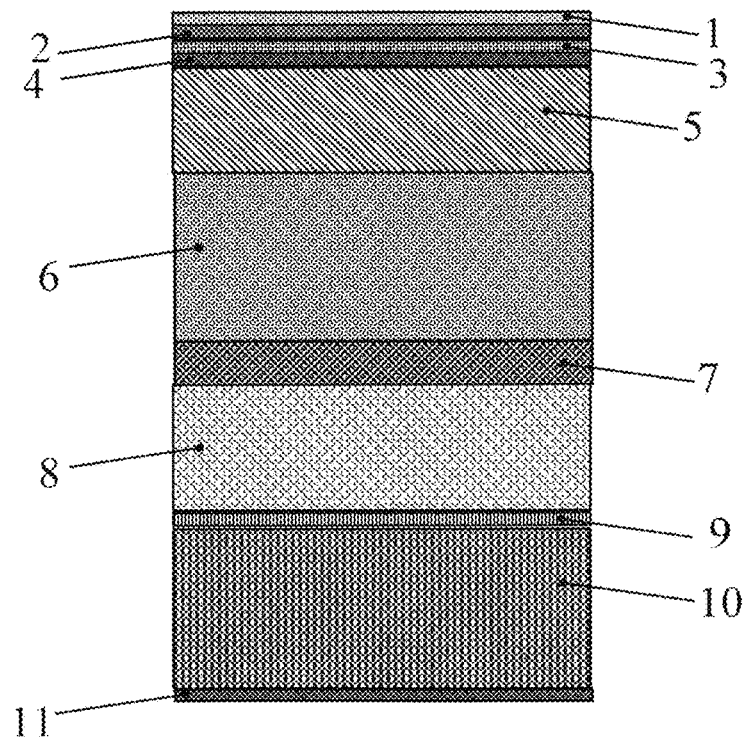
FIG. 2 shows a section taken through a second embodiment of an imitation leather that has been produced using the method according to this invention.

FIG. 2 shows an exemplary embodiment, which builds on the exemplary embodiment in FIG. 1 and in which the layer structure from the top, visible side to the layer 8 corresponds to the structure shown in FIG. 1 and will not be explained again separately here in order to avoid repetitions.

Underneath the textile support 8, the exemplary embodiment shown in FIG. 2 is thus bonded by a breathable adhesive layer 9 which can, for example, be printed and includes a suitable pressure-sensitive adhesive containing polyurethane, acrylate, PVC, or PVDF or a pressure-sensitive adhesive based on aniline-, epoxy- or polyester-polyamide—to a subsequently laminated padding layer 10, which can be composed of, include or comprise, for example, a polyurethane foam, a polyolefin foam, or the like and can optionally also be produced using the method according to this invention. Such an additional subsequently laminated padding layer 10 gives such an imitation leather a particularly elastic flexibility of the kind that is desirable, for example, in applications for sun shades, armrests, and the like.

Underneath the padding layer 10, there is an additional textile backing layer 11, which can be composed of, include or comprise, for example, a woven or nonwoven.

These imitation leathers produced using up to 11 layers of films produced using the method according to this invention have outstanding breathability with gas permeabilities in the range from 1 to 200 dm$^{-2}$ min$^{-1}$, water vapor permeabilities between 0.1 to 200 mg cm$^{-1}$ h$^{-1}$, water impermeabilities between 2 to 60 m$^2$ pa$^{-1}$ w$^{-1}$ with a higher resistance to heat and light as well as wear resistance and are particularly suitable for the production of imitation leathers for automotive interior applications in which the breathability is perceived as particularly comfortable.

The breathability also opens up the possibility of producing wall and ceiling coverings composed of, including or comprising films produced using the method according to this invention, which are extremely rugged, but allow any structural moisture behind the wall or ceiling covering to easily diffuse through the covering, thus effectively preventing structural damage due to the formation of mold and the like.

German Patent Application No. DE 10 2014 103 201.2, filed 11 Mar. 2014 and German Patent Application No. DE 10 2014 110 813.2, filed 30 Jul. 2014 the priority documents corresponding to this invention, to which a foreign priority benefit is claimed under Title 35, United States Code, Section 119, and its entire teachings are incorporated, by reference, into this specification.

What is claimed is:

1. A method for producing a breathable film based on polyvinyl chloride (PVC), including the steps of:
    preparing a paste-like compound including a first fraction of PVC, a second fraction of a foreign material including a dispersion based on polyether polyurethanes, polyester polyurethanes, polycarbonate polyurethanes or mixtures thereof and water, and a third fraction of adjuvants and additives mixed together to form the paste-like compound, wherein the paste-like compound is produced from the fractions without addition of an organic solvent other than water;
    applying the paste-like compound to a base; and
    drying and gelling the paste-like compound applied to the base, through addition of heat, to form the film in which the foreign material causes pores extending from the one surface of the film to an other surface of the film, wherein the pores have an average pore diameter of 1 μm to 1 mm to provide the film breathability with a gas permeability of 0.1 to 200 l dm$^{-2}$ min$^{-1}$ and a water vapor permeability of 0.1 to 200 mg cm$^{-2}$ h$^{-1}$.

2. The method according to claim 1, wherein the first fraction includes an emulsion PVC with a K value of 65 to 80 or suspension PVC or mixtures thereof.

3. The method according to claim 1, wherein the second fraction includes a mixture of water and an emulsifier.

4. The method according to claim 3, wherein the emulsifier includes a polyethylene-, sulfate-, phosphate-, or amine-based soap.

5. The method according to claim 3, wherein the second fraction in relation to 100 wt. % of the first fraction, contains 2 to 50 wt. % water and 0.2 to 10 wt. % of the emulsifier.

6. The method according to claim 1, wherein the paste-like compound contains 2 to 60 wt. % of the second fraction and 98 to 40 wt. % of the first fraction, with a sum of the first fraction and the second fraction equaling 100 wt. %.

7. The method according to claim 1, wherein the adjuvants and the additives include fillers, softeners, cross-linking agents, stabilizers, kickers, silicones, flame retardants, additives and/or pigments.

8. The method according to claim 7, wherein fillers are provided in the form of calcium carbonate, cellulose, calcium sulfate, barium sulfate, silicon dioxide, aluminum dioxide, zinc oxide, and/or zinc bromide.

9. The method according to claim 7, wherein softeners are provided in the form of phtalates, adipates, sebacates, citrates, 1,2-cyclohexane dicarboxylic acid diisononyl ester, dioctyl terephthalate, epoxy softeners, glycol-, oligoglycol-, or polyethylene glycol-based softeners, castor oil-based softeners, polymer softeners, phosphate softeners, cyclic nonaromatic softeners, chlorinated and brominated softeners, sulfate softeners, and/or ionic liquids.

10. The method according to claim 7, wherein cross-linking agents are provided in the form of isocyanates, acridines, carbodiimides, melamines, and/or peroxides.

11. The method according to claim 7, wherein the stabilizers and/or the kickers provided are based on barium, calcium, cadmium, tin, lead, mercury, antimony, arsenic, thiols or mercaptans, phosphites or phosphates, OBS, zinc, magnesium and/or aluminum, phenols, HALS, nano-titanium oxides, β-diketones, epoxy-based stabilizers, perchlorate-based stabilizers, and/or amine-based stabilizers.

12. The method according to claim 7, wherein flame retardants are provided in the form of antimony oxide, aluminum oxide, hydrotalcite, magnesium hydroxide, magnesium carbonate, calcium carbonate, zinc borate and/or phosphates, expanded graphites, and brominated or chlorinated softeners.

13. The method according to claim 7, wherein additives are provided in the form of emulsifiers, soaps, antifoaming agents, rheological additives, nanotubes, quantum dots, and/or blowing agents.

14. The method according to claim 1, wherein the drying and gelling of the paste-like compound for producing the porous film take place with an addition of heat at temperatures of between 100° C. and 220° C.

15. The method according to claim 1, wherein the paste-like compound applied to the base travels through a drying oven with a length of 1 to 80 m and a speed of 2 to 80 m/min and the drying and gelling of the paste-like compound produce the porous film.

16. The method according to claim 1, wherein the breathable film obtained has a water impermeability of 0.1 to 60 m$^2$ pa$^{-1}$ w$^{-1}$.

17. The method according to claim 1, wherein the breathable film obtained has a mass per unit area of 50 to 2000 g/m$^2$.

18. The method according to claim 1, wherein the paste-like compound is applied to the base by a reverse coater or a roll coater, by doctor blades, spraying, or printing.

19. The method according to claim 1, wherein the base is removed from the film after the film forms or is composed of a substrate that remains attached to the film after the film forms.

* * * * *